July 8, 1952 H. L. ECKDAHL 2,602,546
HONEY BOTTLING TANK
Filed April 18, 1946
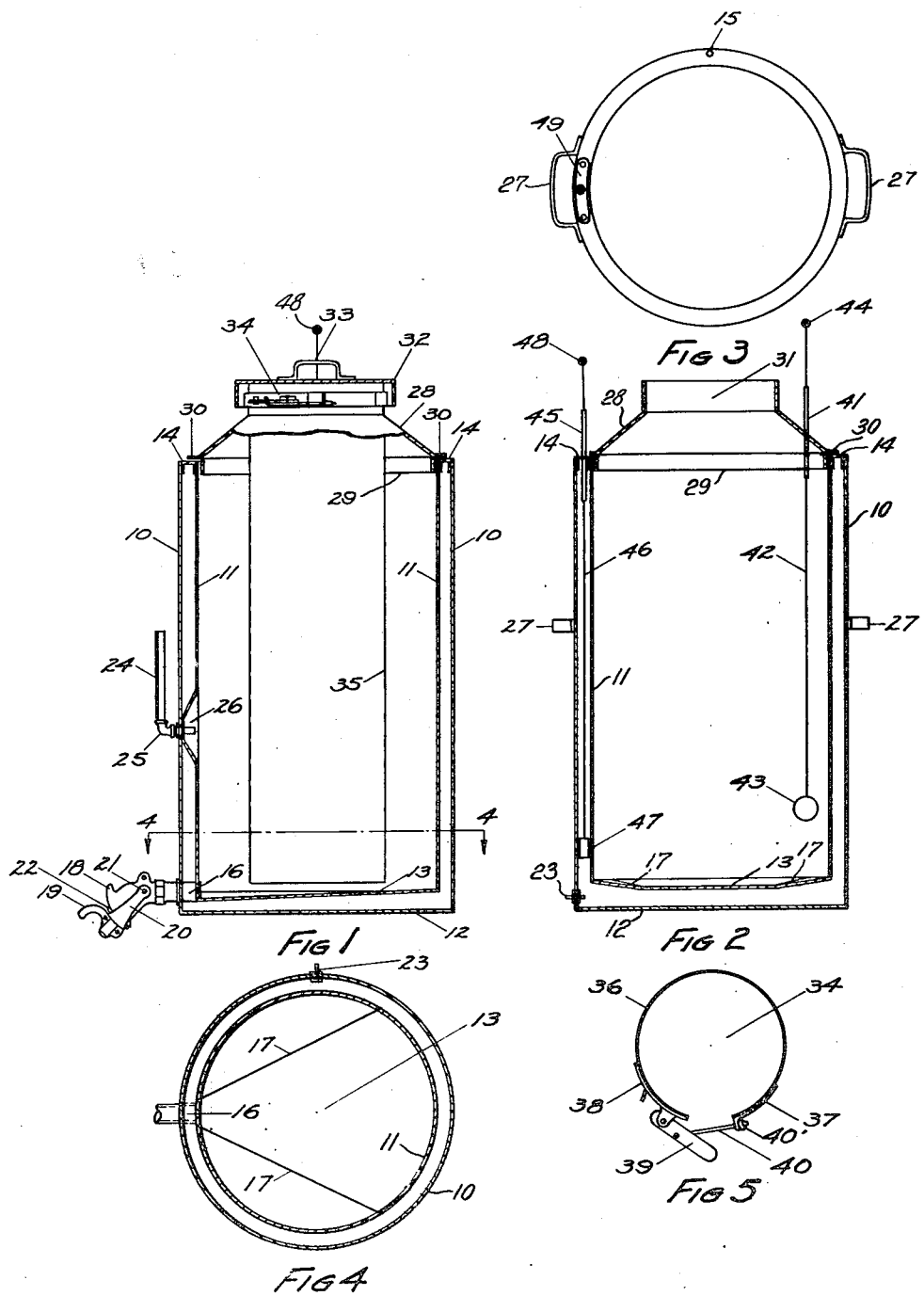
INVENTOR
HAROLD L. ECKDAHL
BY Philip M. Strutrud
ATTORNEY Patented July 8, 1952

2,602,546

UNITED STATES PATENT OFFICE 2,602,546

HONEY BOTTLING TANK

Harold L. Eckdahl, Robbinsdale, Minn.

Application April 18, 1946, Serial No. 663,145

6 Claims. (Cl. 210—150.5)

This invention relates to honey bottling tanks and particularly to construction that not only heats and strains the honey, but which does it in a manner so that the honey stays clear, does not soon become granulated, and retains its flavor and food value.

In bottling honey, considerable difficulty has been experienced with equipment heretofore employed, in obtaining a product that is clear and that is stable and will not soon become granulated. The equipment employed has consisted of open top vessels placed over a source of heat. In some equipment, a double bottom vessel has been employed with water between the two bottoms, so that the honey would not be so readily scorched. In any of such equipment, the honey is not at all uniformly heated. The honey in the bottom becomes very hot, while the balance is interspersed with cold air pockets. These cold air pockets cause the honey to soon become granulated and requires a re-processing in a short time, with a great loss to the industry. Also, the bottled honey has frequently an un-natural appearance, caused by excessive heating and perhaps scorching of portions of it, and also by particles of pollen that have not been strained out. Excessive heating destroying the flavor and food value of honey is still more serious. All this has an adverse effect upon sales and represents a loss to the industry. The need of the industry for improved honey bottling equipment, seems obvious.

It is an important object of my invention, to provide a honey bottling tank construction, so that the entire batch of honey is penetrated by a continued application of uniform heat. My construction is adapted to entrap the heating medium and encompass the honey, so that all cold air pockets are driven out and the honey is readily heated to a uniform temperature. With this equipment, the honey is in condition to be processed at a temperature of 130° to 140° Fahrenheit, which is considerably less than that required by present equipment. Due to this moderate temperature, the honey remains in clear and perfect liquid condition for a year or more and retains its flavor and food value.

Another object is to provide equipment for efficiently straining the honey, co-incident with the process of heating it. All impurities including even small grains of pollen are removed, which become darker if excessively heated and destroy the clarity of the honey.

Another object is to provide a honey bottling tank that is adaptable anywhere. It may employ steam, where same is available, or it may employ water, heated by a gas burner, an electric plate, or set on a stove with a wood or coal fire.

Another object is to provide equipment for dispensing honey into bottles, jars and pails, in an efficient manner, without the usual mess and waste.

Other objects will be apparent from the description and appended claims.

For a full disclosure of my invention, reference is made to the description following and to the drawings, in which—

Fig. 1 is a sectional side elevation view of the complete tank with strainer sack inserted taken substantially medially thereof, but with parts in full to show clamping of the sack.

Fig. 2 is a sectional front elevation view of the tank taken substantially medially thereof, with strainer sack and its clamping band and top cover removed.

Fig. 3 is a plan view of the top of the tank, with the inside fitting, inward and upward sloping cover removed.

Fig. 4 is a sectional view on the lines 4—4 of Fig. 1, with a portion of the honey gate removed for convenience, showing in plan the configuration of the bottom of the tank, which is shown in sectional elevation by Fig. 1 and Fig. 2.

Fig. 5 is a plan view of the clamping band, showing the elements by which it clamps the sack in position around the collar of the inside fitting, inward and upward sloping cover.

In the selected embodiment of my invention which is hereby disclosed, I provide a tank wall 10 preferably of circular cross-section, with an inner wall 11, a bottom 12 and an innerbottom 13. At 14, I provide a rim which provides support in spaced relationship to the outer wall and bottom, for the wall 11 and bottom 13, comprising the inner tank. Except for a vent or filling hole 15, this provides a closed system for the heating medium, whether same be water or steam. The heat is well utilized, whether it be conducted direct from the water or the steam from the water, which is confined in the jacket formed by the construction and which envelops the bath of honey. The small vent 15 merely releases any excess pressure that may be created. The bottom 13 is mainly inclined downward at an angle toward an opening 16, and is auxiliary inclined upward from along lines 17 on each side to the inner wall 11. This causes all of the honey to drain from the tank to the opening 16. Into this opening, which is bushed through the outer wall 10 and screw threaded, a honey gate 18 with an engaging screw threaded section is inserted. This honey gate is of conventional type and is operated by a handle 19, which is internal with pivot arms 20 about a pivot 21. An arcuate brass member 22, between the pivot arms 20, describes an arc coinciding with the gate surface, and closing the opening as desired. A drain plug 23 is provided in the outer wall at the bottom on one side, to drain the water from the tank when not in use. If steam is used as a heating medium, this plug 23 is removed and a steam line inserted in the opening. A waste pipe is inserted in the vent 15 and extended to a proper discharge point. A thermometer 24 of conventional type, with angle connection 25, is provided in the front side of the tank, directly above the honey gate 18. It will be noted, that the thermometer is bushed into a cut away cone section 26 of the inner tank 11, diverging toward the inner side. This results in direct influence of the honey on the thermometer, unaffected by the heating medium. Handles 27 are fixedly attached to the sides of the tank for portability. A sloping side cover 28, with a flange 29 fitting inside the tank and a flange 30 fitting over the edge of rim 14 of the tank, also has a collar 31, over which fits a flanged cover 32 with a handle 33. This cover fits flatly on the top edge of collar 31, but has ample lee-way in its diametrical dimension, to accommodate a clamping device 34, securing a straining sack 35. The clamping device 34 consists of a split band 36, secured at each of its ends by clamping elements 37 and 38, and operated by a lever 39 attached to element 38 and a threaded bolt 40 pivotally attached to lever 39 and by a wing nut 40' adjustably attached to element 37. A straining sack 35, which is preferably made of silk bolting cloth of about 200 mesh per inch, is of suitable length to suspend within the tank and of a diameter to fit over the edge of the collar 31, and there be secured by the clamping device 34. The cover 32 then fits over the collar 31, which has the sack 35 with the clamping device 34 secured to it. Through the cover 28 is provided a small tube or guide 41, through which passes a stem 42, which has attached to the lower end thereof a float ball 43 and to the upper end thereof a ball 44, preferably colored red. This construction provides a gauge to indicate the level of the honey in the tank. Likewise, a guide 45, a stem 46, a float 47 and a ball 48 provide a gauge, to indicate the level of the water in the jacket of the tank. The float in this case, is not a ball but is arcuate in shape, to fit the space between the outer wall 10 and the inner wall 11. A removable cover 49 permits removal of float for inspection. For both these gauges, it is preferable that the stems be of stainless steel and the floats be of copper. It is also preferable that all the inner tank construction, which the honey comes in contact with, be of stainless steel, while the outer tank and covers may be of galvanized iron. Although joining might be in any other conventional manner, a strong all welded construction is preferably employed for the tank and cover structures.

From the foregoing, it will be apparent that it is important that the honey be confined within a vessel which is surrounded by a heating chamber that is closed except for a pressure release vent. This results in a uniform heating of the entire batch of honey and at a lesser temperature, while still eliminating all cold air pockets. The honey therefore, does not lose its natural color, flavor and food value and it does not readily become granulated. Also by straining so thoroughly through the fine mesh sack, which is further made possible by the uniform temperature of the honey, all particles of pollen in addition to impurities are removed, so the honey is nice and clear. With the further advantage of a self-draining bottom leading to an easily operable gate, recessed honey thermometer, honey and water level indicators, and its portability, the combination employed brings about new results in bottling of honey.

While I have shown and described a preferred form of my invention, it is obvious that many changes, which are within the scope of my invention, will be apparent to those skilled in the art. I therefore desire to be limited only by the scope of the appended claims.

What I claim is:

1. A honey bottling tank, comprising in combination, an outer tank, an inner tank in spaced apart relation to said outer tank, a structural support for said inner tank, said structural support consisting of a rim having an inverted channel shaped cross section adapted for securing said tanks thereto, said rim also forming a top edge closure of space between said tanks, a pressure release vent in said closure, a bottom construction of said inner tank having a primary slope and with secondary slopes on respective sides thereof converging to a low point, said inner tank being provided with an orifice at said low point, a first cover member converging inwardly and terminating in a vertical collar at its top, said cover member being provided with a vertical flange engaging the inner side of said inner tank and a horizontal flange engaging said top edge closure of said tanks, a honey straining sack within said inner tank depending from said vertical collar, a clamping device securing said sack to said collar, a second cover member adapted to fit over said collar of said first cover member, floats with indicators to denote respective levels of honey and of water, said honey indicator being positioned in said first cover member and said water indicator being positioned in said top edge closure between said inner and outer tanks and passing through a removable arcuate section of width and length for removal of said float, an outwardly extending cone shaped section in said inner tank wall with its vertex terminating in an opening in said outer tank, a thermometer bushed into said opening in direct contact with a mass of honey, a pivotally operated honey gate at said orifice at the low point of said inner tank, said orifice being bushed through the space between said inner and outer tanks and said honey gate having arcuate engaging surfaces with openings adapted to register as desired to accordingly deliver honey from said inner tank to the exterior of said outer tank, and handles attached on respective sides of said outer tank whereby the entire construction is rendered portable.

2. A honey bottling tank, comprising in combination, a double tank with a substantially equal space maintained between walls thereof on all sides, a varying space between respective bottoms adapted to provide an inner bottom converging toward one side to an outlet, said outlet being bushed through space between said walls, a rim having an inverted channel shaped cross section and shaped to engage the top of the walls of said double tank and structurally support same in spaced apart relation, said rim also forming a top edge closure of space between said walls, a pressure release vent in said closure, a first cover member with flanges engaging the inside and the top edge of said tank and with a taper upwardly to a reduced flanged opening, a second cover member to fit over said opening, a clamping device encompassing the flange of said first cover member opening and adapted to fit in a clamped position inside said second cover member, a straining sack depending from between said clamping device and said first cover member into the interior of said tank, level indicating means for denoting respective levels of honey and water, honey temperature indicating means extending through to the inner wall of said tank, said inner wall at point of insertion being shaped in the form of a frustum of a cone and diverging toward the inside, so that the mass of honey makes full and direct contact with said temperature indicating means, honey dispensing means in the form of a gate with a manually operated variable opening co-operating with said bushed outlet, so that the tank is completely emptied by gravity, and handles attached on diametrically opposed sides of the outside of the double tank to facilitate portability of the entire device.

3. A honey bottling tank, comprising in combination, an outer tank, an inner tank in spaced apart relation to said outer tank, means for confining vapor from heated water in the space between the two tanks, so that the entire contents of the inner tank are heated to a uniform temperature, said means also providing structural support for said inner tank in said relation to said outer tank, said means having connections, whereby circulation of vapor from a separate source can be provided, a plurality of cover means consisting of a member with flanges engaging the inside and the top edge of said bottling tank and with a taper upwardly to a reduced diameter flanged opening, a member to fit over and close said opening, all so arranged that heat is not dissipated from the contents of said inner tank, an annular split band having inter-connected levers between its respective ends, said band by adjustment of said levers engaging exteriorly the top portion of the first mentioned member of said cover means, and encompassed by said second mentioned member, a strainer bag situate within said inner tank and retentively positioned between said band and said portion of said cover means, a bottom construction of said inner tank with slopes of substantial segments compounded with a main slope extending full length of the diameter and leading to a low point in its perimeter, said tank being provided with an orifice at said low point, liquid level denoting means for honey in said inner tank, a cone shaped extension of the chamber of said inner tank to a convenient point in the lower portion of said outer tank, at which point a temperature indicating device projects into said cone shaped extension and into said inner tank, said extension providing for full and direct contact of a mass of honey with said temperature indicating device, a honey dispensing gate engaging said orifice at said low point in the inner tank bottom perimeter, said orifice being bushed through space between said inner and outer tanks and said honey dispensing gate having arcuate engaging surfaces with openings adapted to register as desired to accordingly deliver honey from said inner tank to exterior of said outer tank, and carrying handles attached at two sides of said outer tank.

4. A honey bottling tank, comprising in combination, a cylindrical open topped tank with a closed water jacket, a cover consisting of a lower section and an upper section, said lower section having a vertical flange fitting inside of said water tank, a horizontal flange fitting over the edge of said water jacket and a vertical flange on a reduced diameter top of said lower section, said upper section being adapted to fit loosely downwardly over said vertical flange on top of said lower section, an inner bottom of said tank with intersecting planes converging to a low point at the perimeter of the tank, an orifice provided at said low point and bushed through said water jacket, a dispensing device engaging said orifice, a clamp adapted to engage said vertical flange of said lower section of cover around its periphery, a straining sack within said tank and depending from said lower section of cover, having its open end positioned and held between said clamp and said vertical flange of said lower section of cover, and having its open end covered by said upper section of cover, a cone shaped extension in said water jacket converging toward its outside, to engagement with a temperature indicating element, a pressure release vent in top of said water jacket, a drain plug in bottom of said water jacket, liquid level indicating devices actuated by floats on lower ends of rods extending upwardly through said lower cover and said water jacket, for denoting respective levels of honey and of water, and carrying devices to facilitate portability of the tank with its contents.

5. A honey bottling tank, comprising in combination, an inner tank member, an outer tank member, said tank members being maintained in equal spaced apart relation laterally, bottom means in said inner tank member in unequal spaced apart relation to said outer tank member and sloped to drain entire contents of inner tank member to a single point, an orifice provided at said point and bushed through space formed between said inner and outer tank members, a dispensing gate engaging said orifice, said inner tank member being so inter-connected and in closed relationship with said outer tank member that a heating medium jacket construction results between said tank members, a first cover member engaging the top of said tank members, a second cover member engaging the top of said first cover member, a clamping device engaging the top of said first cover member and in clamped position encompassed by said second cover member, a straining sack within said inner tank member and depending from and folded over the top of said first cover member and there engaged by said clamping device, a cut out funnel shaped section from said inner tank member to said outer tank member, so arranged that the contents of the inner tank are directly accessible through an opening in the outer tank, a temperature indicating element in said opening extending into said funnel shaped section and said inner tank, liquid level denoting means in said inner tank member and in said heating medium jacket construction actuated by floats on the lower ends of rods extending upwardly through the cover of said tank member and the top of said jacket, a top vent and a bottom drain in said heating medium jacket construction, said top vent being also a filling orifice, and handles attached on each side of the outer tank by which the entire device is rendered portable by human hand.

6. In a honey bottling tank, in combination, an outer tank, an inner tank is spaced apart relation to said outer tank, an inverted channel shaped closure and supporting section between top edges of said tanks, a pressure release vent in said closure section, a pair of covers consisting of a cover with a flange engaging the inside of said inner tank and a flange engaging the channel shaped closure of both tanks, said cover having a taper upwardly to a reduced diameter flanged opening, a second cover to fit over and close said opening, a straining sack depending from said first mentioned cover, a clamping device securing the upper end of said sack as it is folded over the edge of said cover, said clamping device being accommodated in space between interengaging flanges of said pair of covers, a bottom construction of said inner tank with slopes of substantial segments compounded with a main slope extending full length of the diameter and positioned to lead the contents by gravity to a common point, a gate at said point, a cut out section between tanks converging from said inner tank to an opening in said outer tank, means for indicating temperature bushed through said opening and extending through said cut out section to the line of the inside tank, said means being free of other influence than temperature of the contents of said tank.

HAROLD L. ECKDAHL.

REFERENCES CITED

The following references are of record in the file of this patent:

UNITED STATES PATENTS

| Number | Name | Date |
|---|---|---|
| 409,339 | Stuyvesant | Aug. 20, 1889 |
| 664,290 | Reeves | Dec. 18, 1900 |
| 1,028,023 | Hocker | May 28, 1912 |
| 1,196,621 | Weinberg | Aug. 29, 1916 |
| 1,249,057 | Finley | Dec. 4, 1917 |
| 1,327,166 | Mitchell | Jan. 6, 1920 |
| 1,351,293 | Leech | Aug. 31, 1920 |
| 1,428,205 | Barry | Sept. 5, 1922 |
| 2,105,478 | Harris et al. | Jan. 18, 1938 |

FOREIGN PATENTS

| Number | Country | Date |
|---|---|---|
| 2,797 | Great Britain | of 1856 |